(12) United States Patent
Hellouin et al.

(10) Patent No.: US 12,275,182 B2
(45) Date of Patent: Apr. 15, 2025

(54) MOULDING UNIT WITH BISTABLE MAGNETIC DEVICE

(71) Applicant: SIDEL PARTICIPATIONS, Octeville-sur-Mer (FR)

(72) Inventors: Damien Hellouin, Octeville-sur-Mer (FR); Sébastien Fevre, Octeville-sur-Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 258 days.

(21) Appl. No.: 17/760,950

(22) PCT Filed: Sep. 18, 2020

(86) PCT No.: PCT/EP2020/076102
§ 371 (c)(1),
(2) Date: Mar. 16, 2022

(87) PCT Pub. No.: WO2021/053140
PCT Pub. Date: Mar. 25, 2021

(65) Prior Publication Data
US 2022/0332034 A1   Oct. 20, 2022

(30) Foreign Application Priority Data

Sep. 19, 2019 (FR) .................... 1910316

(51) Int. Cl.
*B29C 49/56* (2006.01)
*B29C 49/58* (2006.01)
*B29L 31/00* (2006.01)

(52) U.S. Cl.
CPC .......... *B29C 49/56* (2013.01); *B29C 49/58* (2013.01); *B29C 2049/5665* (2022.05); *B29C 2049/5882* (2013.01); *B29L 2031/712* (2013.01)

(58) Field of Classification Search
None
See application file for complete search history.

(56) References Cited

U.S. PATENT DOCUMENTS

| | | | |
|---|---|---|---|
| 2007/0190202 | A1 | 8/2007 | Mie et al. |
| 2014/0151940 | A1 | 6/2014 | Philipp et al. |
| 2016/0042897 | A1 | 2/2016 | Qian |
| 2017/0021553 | A1 | 1/2017 | Kharchenko et al. |

FOREIGN PATENT DOCUMENTS

| | | |
|---|---|---|
| CN | 109278273 A1 | 1/2019 |
| DE | 102013111948 A1 | 4/2015 |
| EP | 2740582 A1 | 6/2014 |

(Continued)

OTHER PUBLICATIONS

International search report dated Dec. 2, 2020.

*Primary Examiner* — Robert J Grun
(74) *Attorney, Agent, or Firm* — Blake T. Hudson

(57) ABSTRACT

The invention relates to a unit for molding containers, which comprises two mold supports, a device for locking the mold supports in the closed position, and a bistable device which comprises a fixed element and a mobile element able to move between two stable extreme positions. The mobile element comprises a mobile magnetic dipole, and the fixed element comprises a fixed magnetic dipole, the fixed magnetic dipole applying a magnetic force from a distance to the mobile magnetic dipole in order to force the mobile element toward one or other of its two stable extreme positions.

20 Claims, 17 Drawing Sheets

(56) References Cited

FOREIGN PATENT DOCUMENTS

| | | |
|---|---|---|
| EP | 3431253 A1 | 1/2019 |
| FR | 2863930 A1 | 6/2005 |
| RU | 2002104113 A | 3/2004 |
| WO | 2015136368 A2 | 9/2015 |

[Fig. 1]
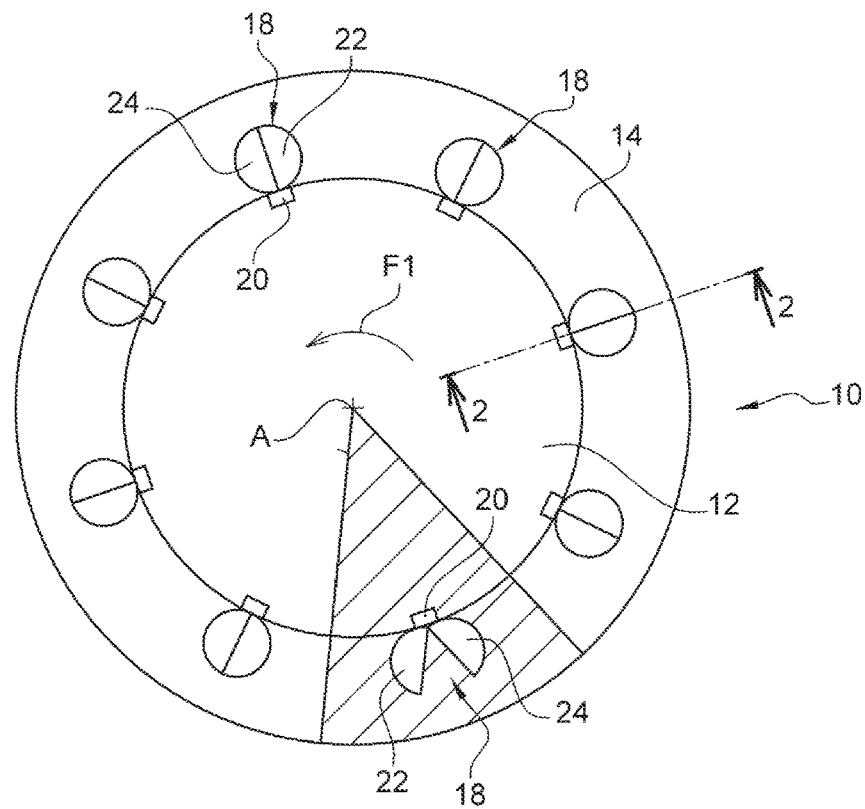
[Fig. 2]
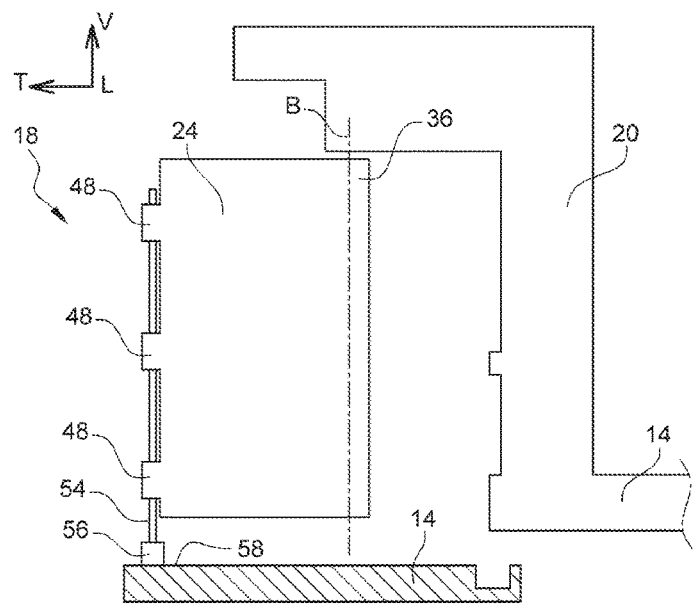

[Fig. 2A]
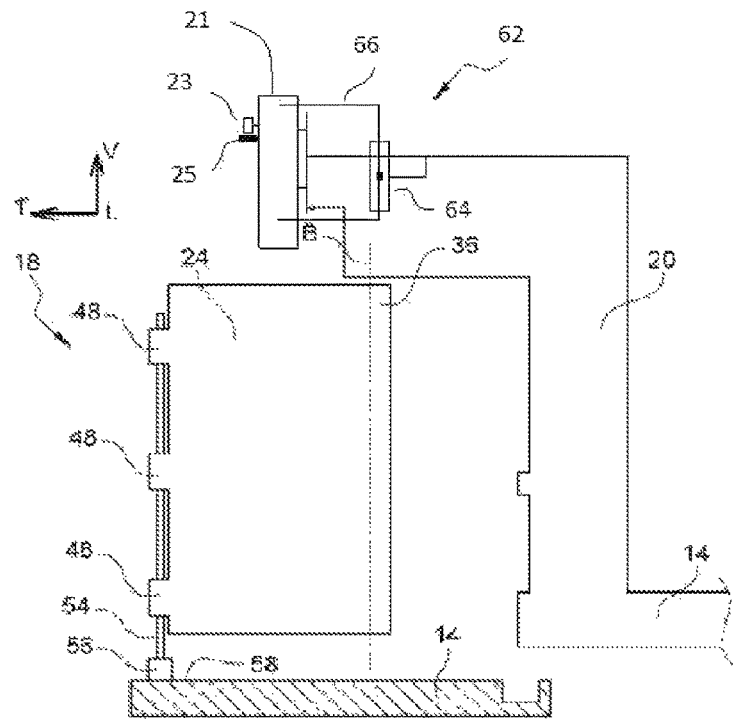
[Fig. 2B]
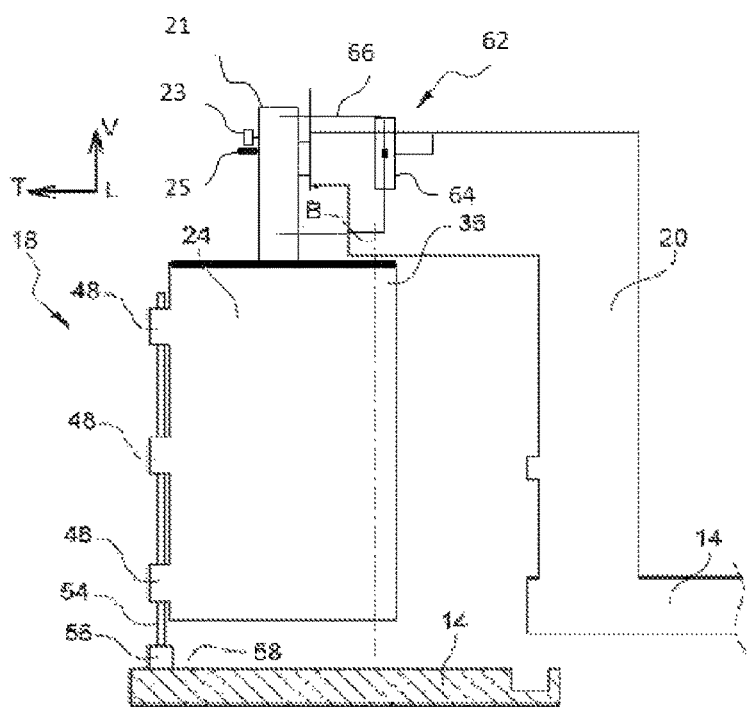

[Fig. 3]
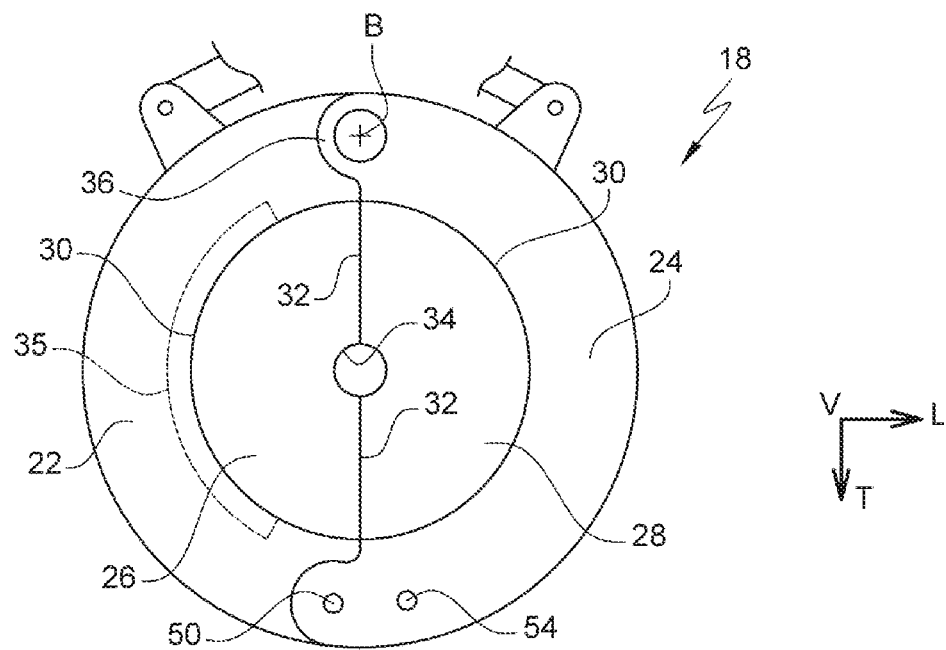
[Fig. 4]
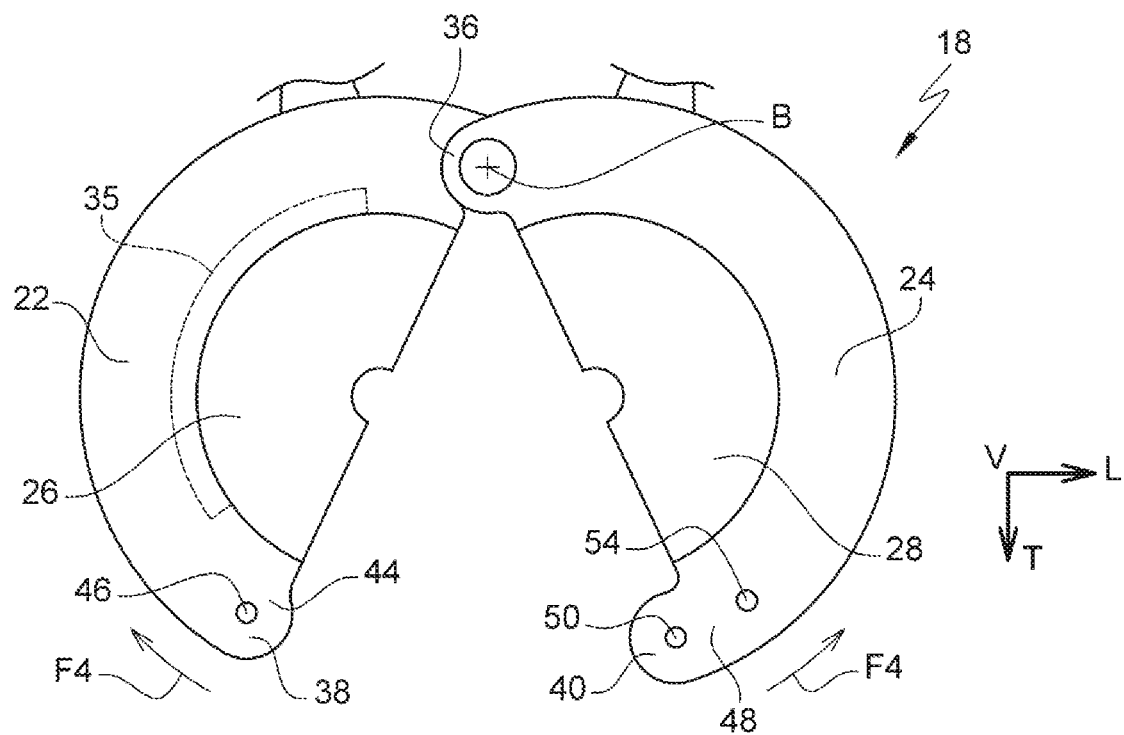

[Fig. 5]
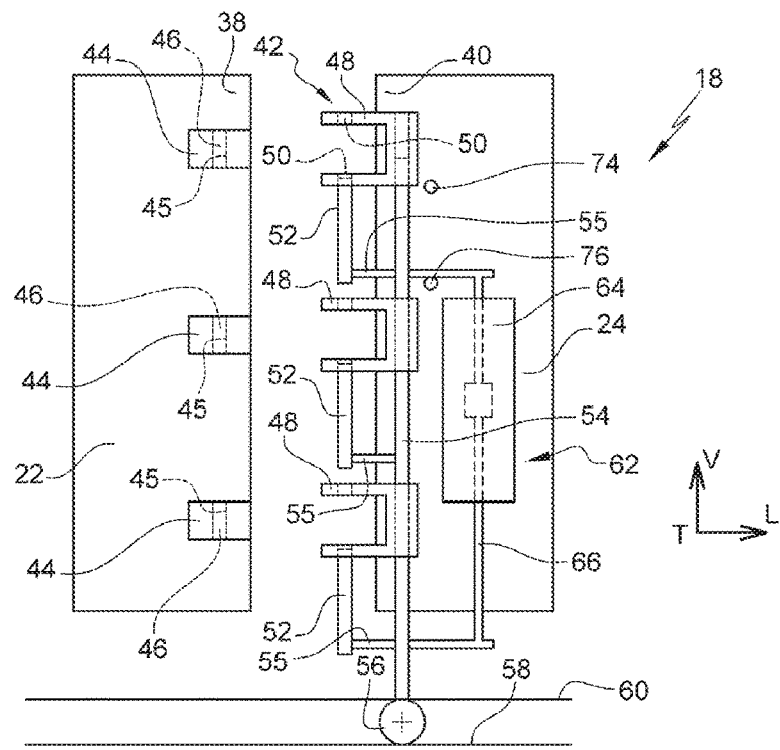
[Fig. 6]
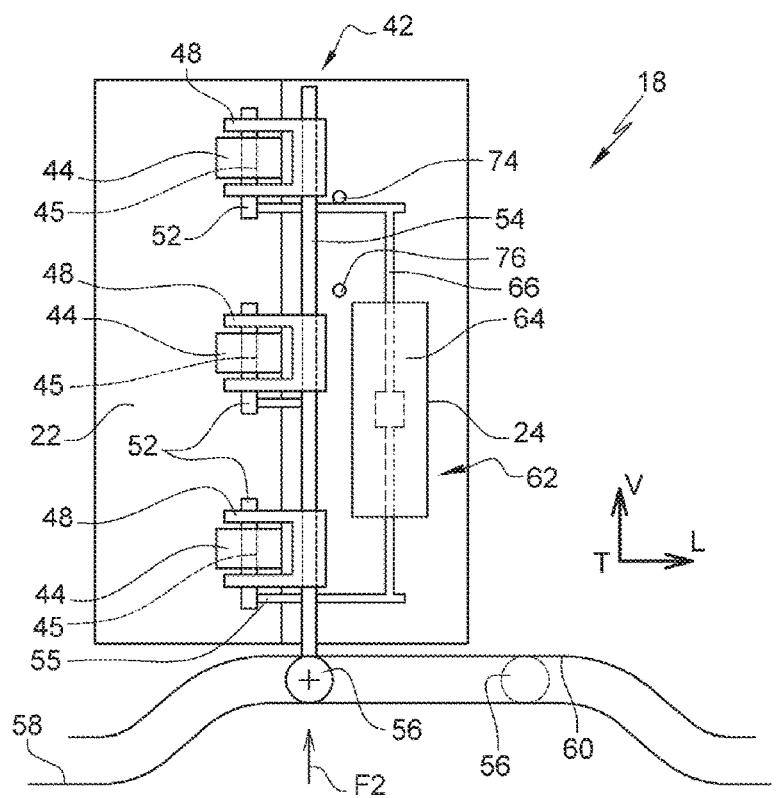

[Fig. 7]
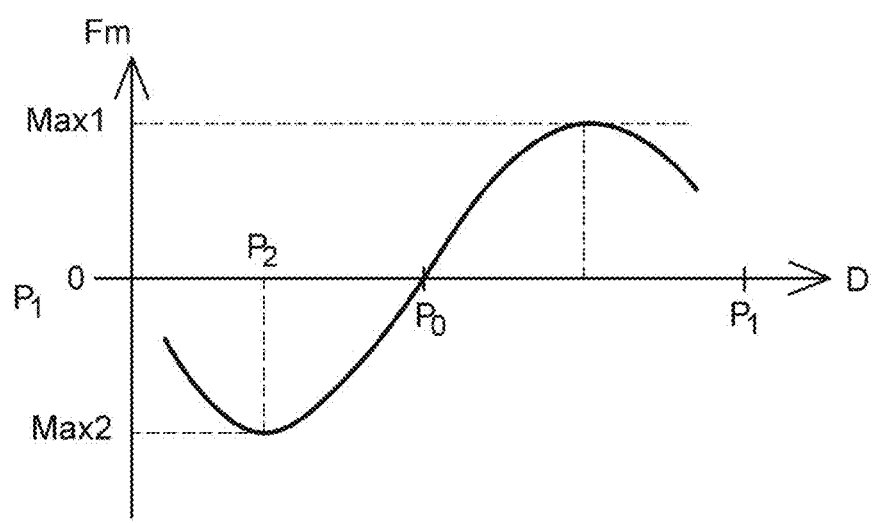

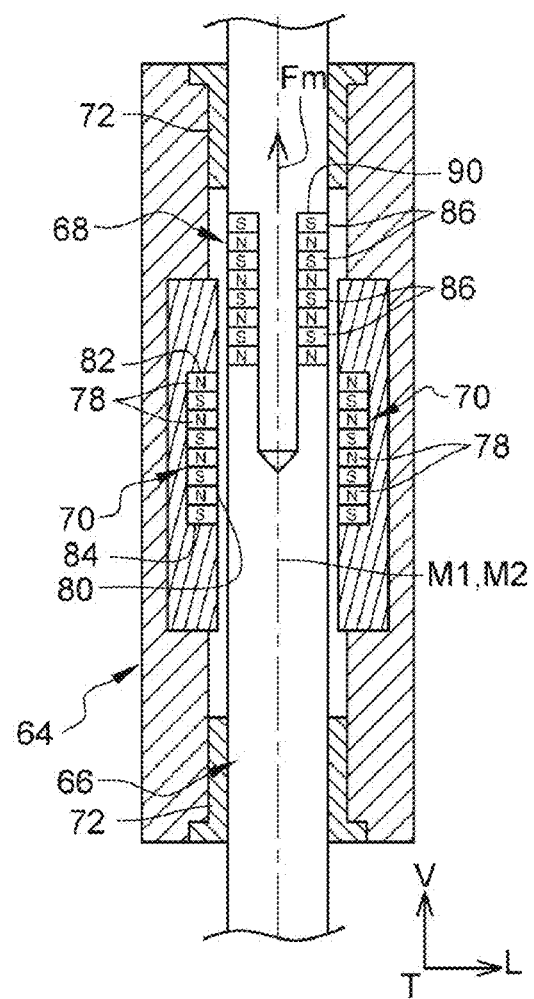
[Fig. 8]

[Fig. 9]
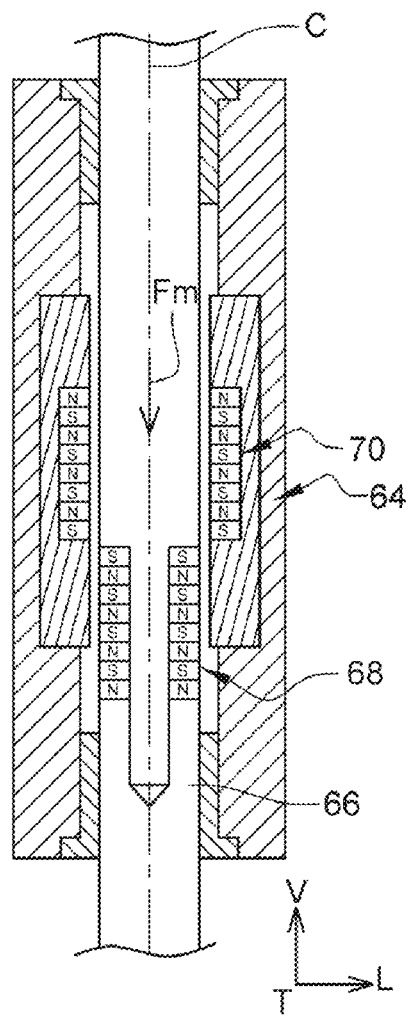

[Fig. 10]
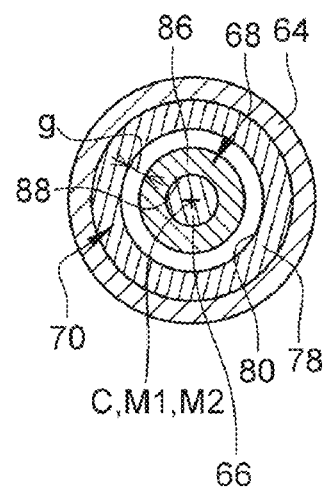

[Fig. 11]
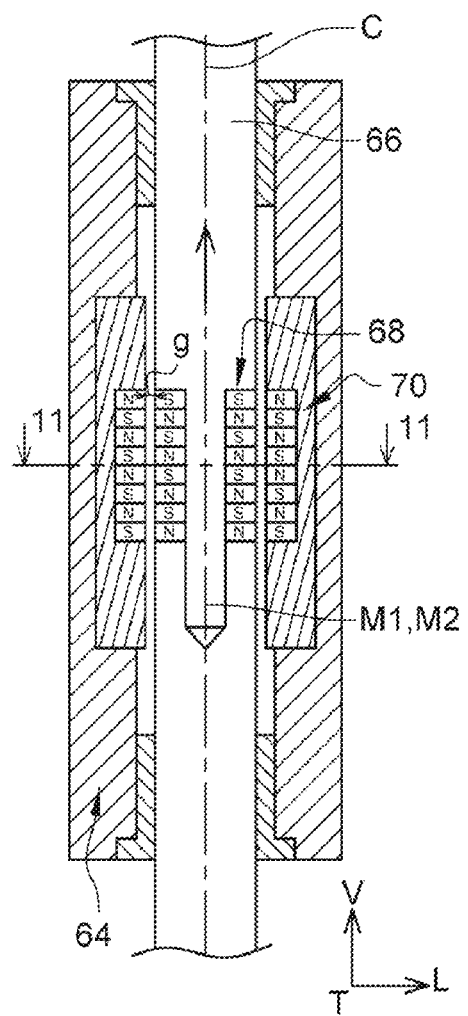

[Fig. 12]
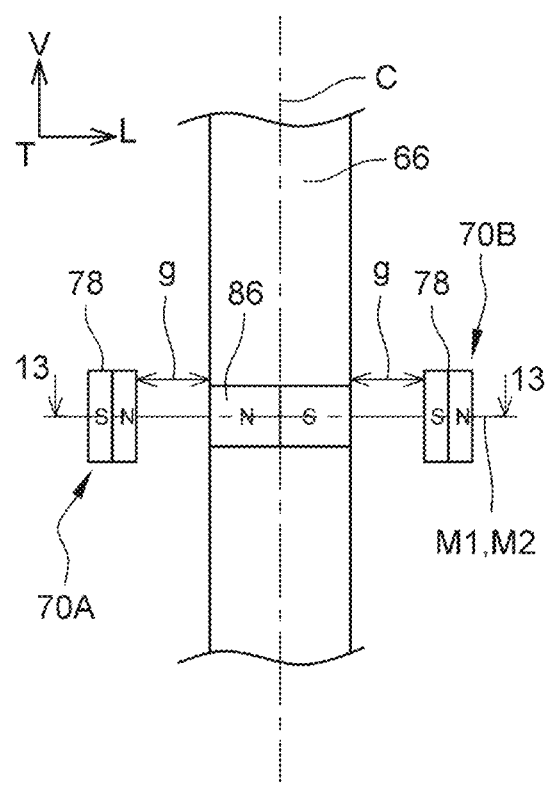

[Fig. 13]
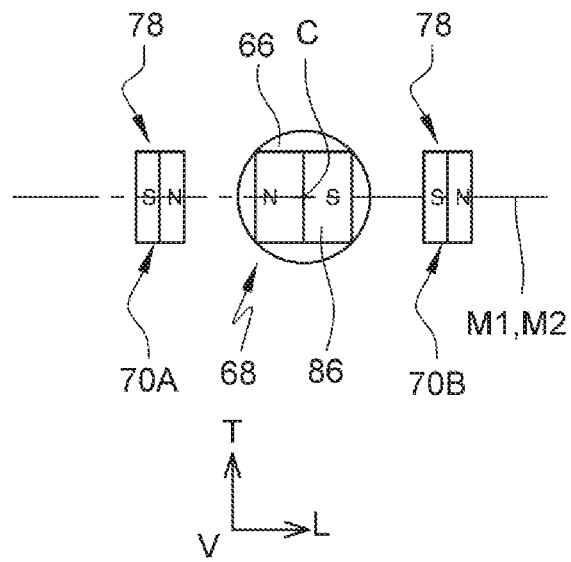
[Fig. 14]
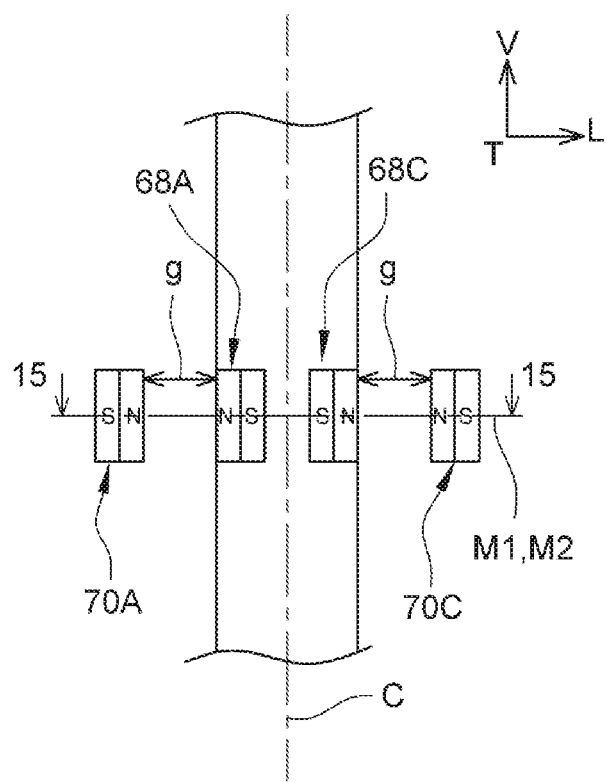

[Fig. 15]
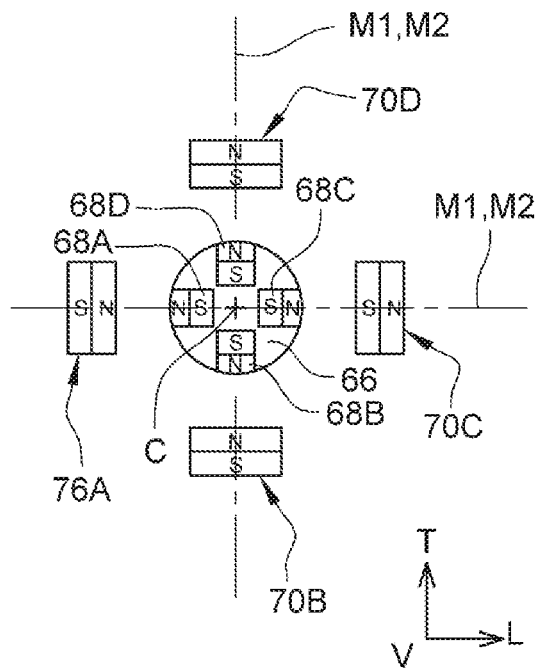
[Fig. 16]
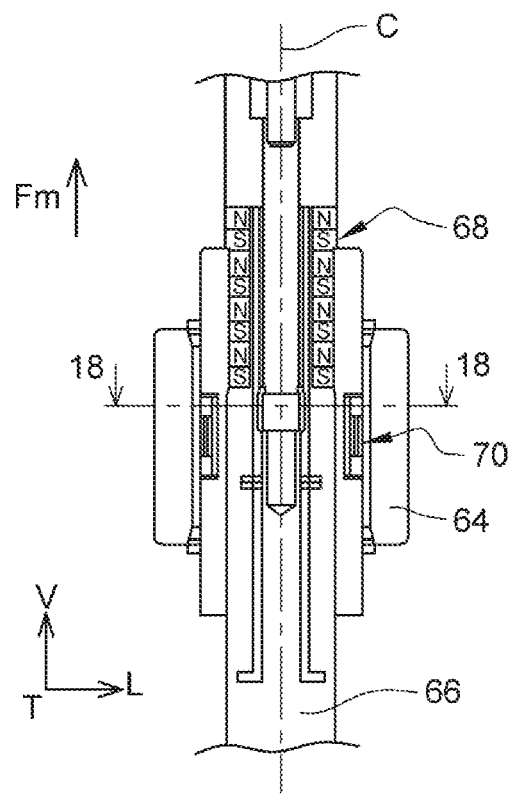

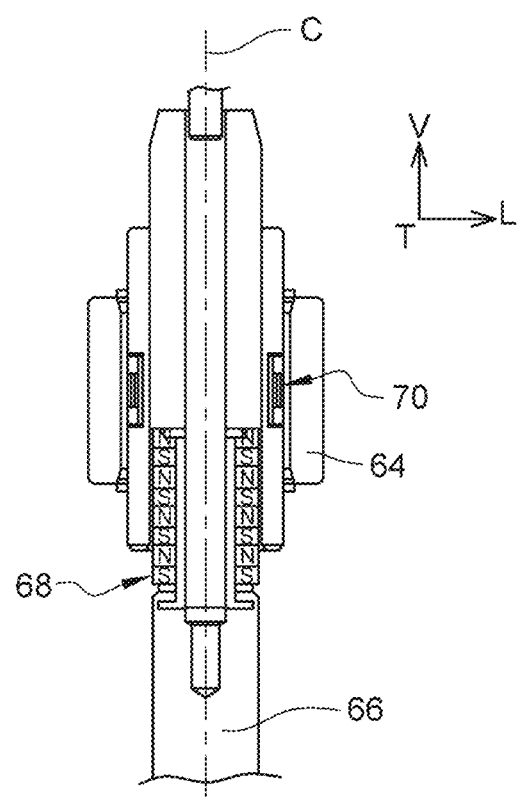
[Fig. 17]

[Fig. 18]
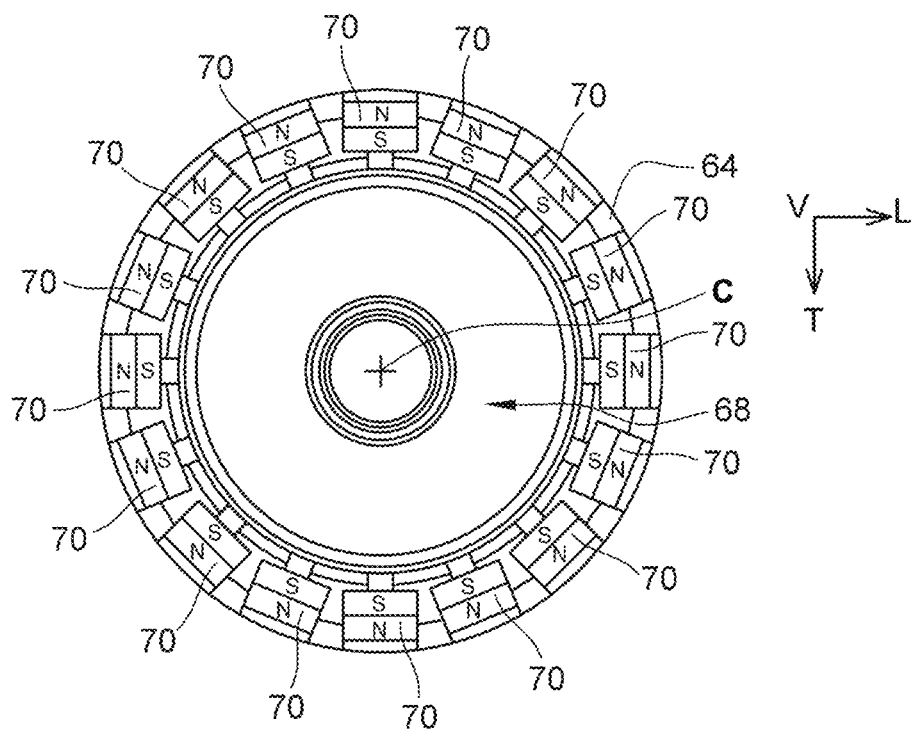

[Fig. 19]
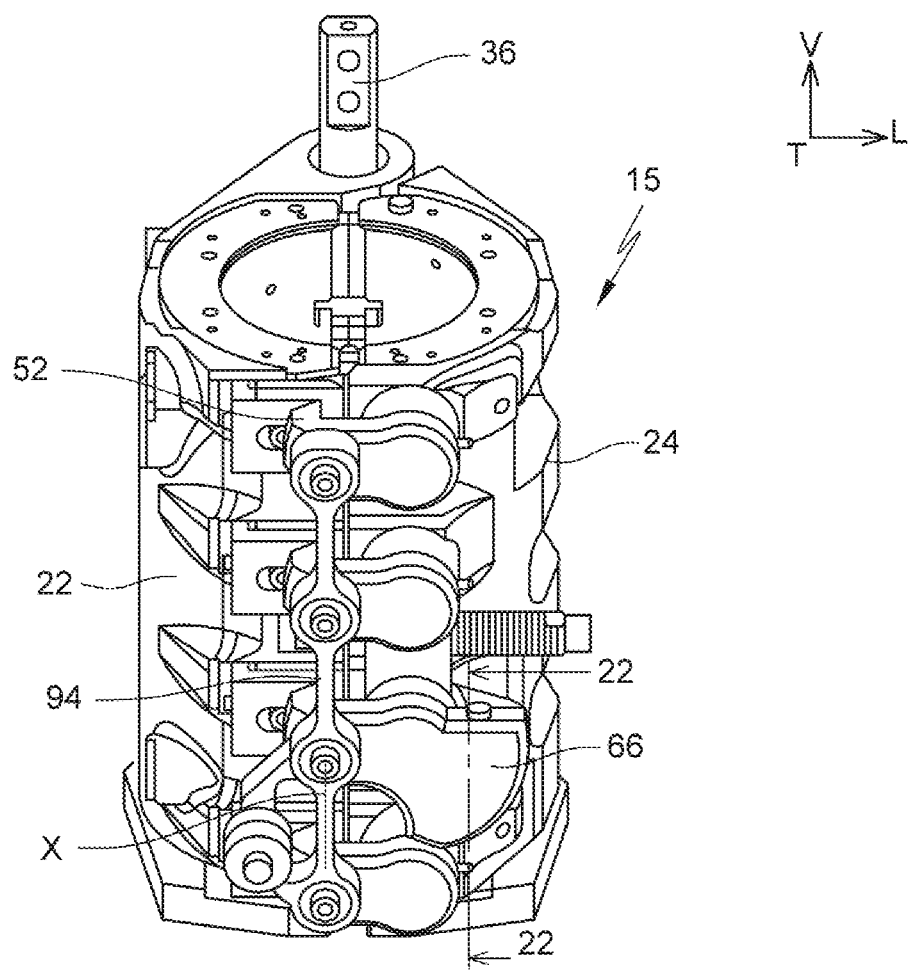

[Fig. 20]
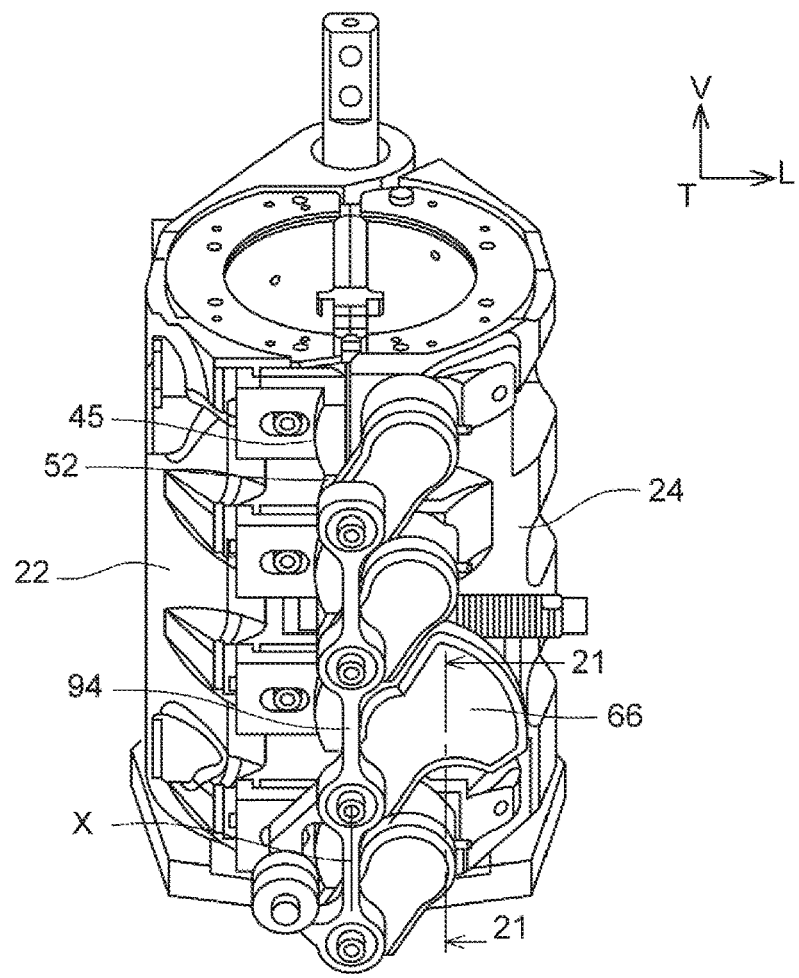
[Fig. 21]
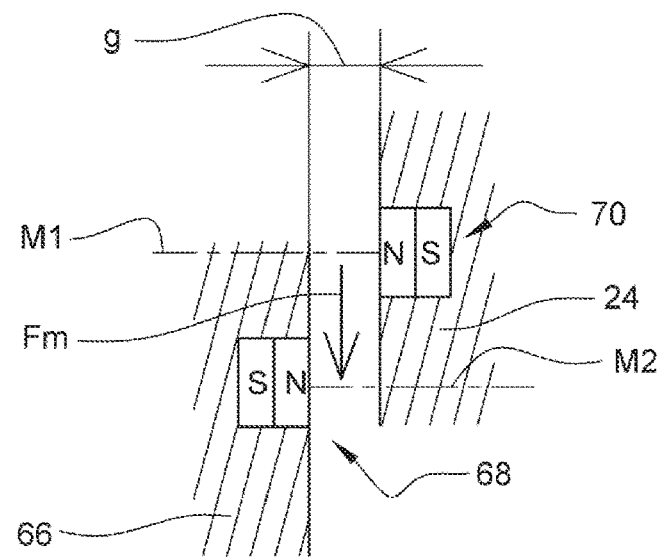

[Fig. 22]
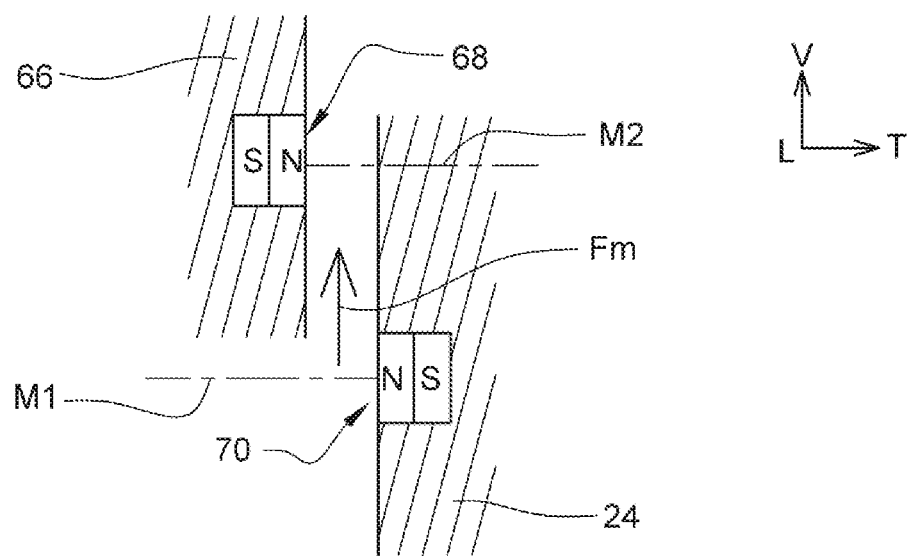

MOULDING UNIT WITH BISTABLE MAGNETIC DEVICE

CROSS-REFERENCE TO RELATED APPLICATIONS

This application is a 371 U.S. National Stage Application of PCT Application Serial No. PCT/EP2020/076102 filed on Sep. 18, 2020, which application claims the benefit of and priority to French Application No. FR1910316, filed Sep. 19, 2019, the entire contents of each of which are hereby incorporated herein by reference.

TECHNICAL FIELD OF THE INVENTION

The invention relates to the field of units for molding containers, notably by blow-molding thermoplastic preforms, which comprise two mold supports each of which is intended to support part of a mold and which are mounted with the ability to move one relative to the other between an open position and a closed position in which they are able to be locked by a locking device. The molding unit is more particularly equipped with a bistable device which allows the locking device to be forced toward its locked position or toward its unlocked position corresponding to each of its stable extreme positions.

BACKGROUND OF THE INVENTION

The invention relates to a molding unit intended to equip a station for forming thermoplastic containers in mass-production runs. In such a station, hot preforms are shaped into final containers by blow-molding in molds. In the known way, each mold is produced in at least two parts which can be brought into a meeting position to reconstitute the full molding cavity of the container that is to be produced Each mold is mounted in an associated molding unit. In order to allow the production of containers of different models, each mold part is fixed removably in an associated mold support of the molding unit. The mold supports are able to move relative to one another between an open position, in which the two mold parts are parted, and a closed position, in which the two mold parts meet. When there is sought to be a change in the model of container, all that is required is for the current molds to be removed from the mold supports and replaced with new molds.

In order to allow the mass production of containers, a plurality of molding units are supported at the periphery of a rotary carousel which revolves continuously. The preforms are received in the molds at a given point of entry, while the containers are extracted from the molds at a given exit point. To allow a new preform to be inserted and a finished container to be extracted, the mold supports are made to move into their open position. Thus, as they journey along an angular sector extending from the exit point to the point of entry, the molds are kept in the open position.

The preforms are shaped into containers in the molding units by blow-molding or stretch-blow-molding as they are being transported from the point of entry to the exit point. Throughout their path from the point of entry to the exit point, it is imperative for the mold supports to occupy a closed position in which the two parts of the mold meet.

Specifically, in order to avoid damage to the molds as they close, at least one of the two mold parts is mounted floating with a limited amount of play on its mold support. During blowing, a compressed fluid at the same pressure as the blow-molding fluid, for example 40 bar, is injected into a compensation chamber comprised between the mold support and the floating mold part in order to press the latter firmly against the other mold part. This makes it possible to obtain containers with a parting line that is not very visible.

Now, if the mold supports are not kept in their closed position at the moment at which the pressurized fluid is injected into the compensation chamber, the floating mold part is pushed by the pressure with enough force to pull out its means of attachment to the mold support. The mold part may thus be ejected. Such a mold part may weigh up to several tens of kilograms. Ejection of the mold part thus carries the risk of causing significant damage to the forming station and of endangering the physical integrity of human operators stationed nearby.

In order to ensure that the two mold parts are meeting properly without causing the mold supports to open, the latter are locked in the closed position by a controlled locking device. The locking device comprises a locking member which is mounted with the ability to move on one of the mold supports between a locked position in which it collaborates with a blocking face of the other of the supports to prevent the mold supports from opening, and an unlocked position in which the locking member is retracted with respect to the blocking face in order to allow the mold supports to open.

The movements of the locking member between its two, locked and unlocked, positions are generally controlled by means of a cam-operated control device. A cam is arranged fixedly on a fixed base on which the carousel is mounted to rotate, whereas the mold support equipped with the locking member comprises a cam follower which is connected to the locking member and which brings about the movements of the locking member through collaboration with the cam.

To ensure correct operation of the molding unit, it is important to make sure that the locking member is correctly commanded into one or the other of its locked or unlocked positions and that it does not remain stuck in an intermediate position that would not allow it either to open or to close correctly.

For this purpose, it is already known practice to equip such a molding unit with a bistable device that has two stable positions corresponding to the locked and unlocked positions of the locking member. The bistable device thus forces the locking member toward one or the other of its locked or unlocked positions when the locking member is occupying an intermediate position. The stable position toward which the locking member is pushed depends on its position with respect to an unstable equilibrium position of the bistable device.

Known bistable devices work by mechanical contact between a mobile element mounted with the ability to move on the mold support and mechanically connected to the locking member, and a fixed element. The mobile element is equipped with a cam. The mold support bears the fixed element which is formed of a cam follower comprising a roller that is forced elastically toward the cam of the mobile element. The cam profile is designed so that the force applied by the cam follower to the cam pushes the mobile element toward one or the other of its stable positions.

Such a bistable device has to apply enough retaining force to keep the mobile element in each of its stable positions to prevent any unwanted movement of the locking member, notably under the effect of gravity or of centrifugal force. The cam-operated control device controlling the locking member is, by contrast, designed to overcome the retaining force and thus command the locking member toward its other stable position.

Such a device involving mechanical contact performs its role entirely satisfactorily. However, it does require regular maintenance operations, notably to lubricate the roller and the mobile elements of the cam follower, or else to replace the elements that come into contact with one another and are liable to wear.

Such maintenance operations need to be performed frequently, for example around once a week. They take around 15 minutes per molding unit. Now, a blow-molding station generally comprises several molding units. Such a maintenance operation is therefore liable to keep the installation out of operation for several hours and/or to require the intervention of several operators.

There is therefore a need to reduce the time and/or labor required for the upkeep of the bistable device of each molding unit.

SUMMARY OF THE INVENTION

According to a first embodiment, the invention proposes a station for forming thermoplastic containers, which comprises:
- a unit for molding containers, notably by blow-molding preforms:
- a support frame;
- a blowing device capable of translational movement with respect to said support frame between two stable extreme positions, a blow-molding position in which the blowing device is in contact with the upper surface of the mold to blow the preform, and a retracted position allowing the preform to be introduced or the container to be extracted;
- a bistable device which comprises:
  - a fixed first element that is fixed with respect to said support frame,
  - a mobile second element connected to the blowing device and able to move between two stable extreme positions situated one on each side of an unstable equilibrium intermediate position, and which is connected in terms of movement to the blowing device, the mobile element interacting with the fixed element to force the blowing device toward its blowing position or toward its retracted position corresponding to each of its stable extreme positions.

The forming station is characterized in that the mobile element comprises a first magnetic dipole, referred to as the mobile magnetic dipole, and the fixed element comprises at least a second magnetic dipole, referred to as the fixed magnetic dipole, the fixed magnetic dipole applying a magnetic force from a distance to the mobile magnetic dipole in order to force the mobile element toward one or other of the stable extreme positions whatever its position between its two stable extreme positions.

According to a second embodiment, the invention proposes a station for forming thermoplastic containers, which comprises:
- a unit for molding containers, notably by blow-molding preforms:
- a first mold support and a second mold support which are each intended to support part of a mold, the mold supports being mounted with the ability to move one relative to the other between an open position in which they are parted from one another, and a closed position in which they meet;
- a locking device for locking the mold supports in the closed position and which comprises at least one locking member mounted with the ability to move on the second mold support between a locked position in which it collaborates with at least a blocking face of the first mold support so as to prevent the opening of the mold supports and an unlocked position in which the locking member is retracted with respect to the blocking face so as to allow the opening of the mold supports;
- a bistable device which comprises:
  - a fixed first element that is fixed with respect to the second mold support,
  - a mobile second element which is mounted with the ability to move on the second mold support between two stable extreme positions situated one on each side of an unstable equilibrium intermediate position, and which is connected in terms of movement to the locking member, the mobile element interacting with the fixed element to force the locking device toward its locked position or toward its unlocked position corresponding to each of its stable extreme positions.

The forming station is characterized in that the mobile element comprises a first magnetic dipole, referred to as the mobile magnetic dipole, and the fixed element comprises at least a second magnetic dipole, referred to as the fixed magnetic dipole, the fixed magnetic dipole applying a magnetic force from a distance to the mobile magnetic dipole in order to force the mobile element toward one or other of the stable extreme positions whatever its position between its two stable extreme positions.

The second embodiment may exhibit one or more of the following features regarding the forming station, considered separately or in combination:
- the movements of the mobile element are halted in its two stable extreme positions by associated mechanical end stops, the repulsion force applied by each fixed magnetic dipole to each mobile magnetic dipole being sufficient to keep the locking member in its locked or unlocked position corresponding to one or other of the stable extreme positions of the mobile element;
- the mobile element is mounted with the ability to slide on the second mold support between its two stable extreme positions along a rectilinear path;
- the mobile element is mounted with the ability to pivot on the second mold support between its two stable extreme positions about an axis of pivoting, the mobile magnetic dipole being fixed to the mobile element eccentrically with respect to the axis of pivoting.

The first and/or the second embodiment may advantageously exhibit one or more of the following features regarding the magnetic dipole:
- the fixed magnetic dipole acts by magnetic repulsion on the mobile magnetic dipole by applying to it a repulsion force to push the mobile element toward one or other of its two stable extreme positions;
- each of the magnetic dipoles constantly emits a magnetic field, such as a permanent magnet;
- the variation in the repulsion force as a function of the position of the mobile element exhibits a gradient which connects two extrema of opposite signs, the at least one fixed magnetic dipole being designed so that the norm of the force applied to the at least one mobile magnetic dipole is comprised between 30 N and 100 N, for example equal to approximately 60 N, in each of its two stable extreme positions;
- the fixed and mobile magnetic dipoles are designed so that the norm of the force applied to the at least one mobile magnetic dipole is equal to its local extremum in each of its two stable extreme positions;

each fixed magnetic dipole has a polar axis oriented orthogonally to the path of the fixed element, one of the poles, referred to as the active pole, of each fixed magnetic dipole being arranged facing the path of the mobile magnetic dipole;

the fixed element comprises a plurality of fixed magnetic dipoles, all the fixed magnetic dipoles featuring an active pole of the same polarity;

each mobile magnetic dipole has a polar axis oriented in the direction of its path, each mobile magnetic dipole featuring a pole referred to as the "repulsion pole" which has the same polarity as the active pole of the fixed magnetic dipoles, the repulsion poles passing past the active poles when the mobile element is occupying an intermediate position between its two stable extreme positions;

each fixed magnetic dipole has a polar axis oriented parallel to the path of the mobile element;

each mobile magnetic dipole has a polar axis oriented orthogonally to its path so that at least one repulsion pole of each mobile magnetic dipole is arranged facing an active pole of the same polarity of a fixed magnetic dipole as the mobile element moves between its two stable extreme positions;

each mobile magnetic dipole has a polar axis oriented parallel to its path, the polarity of the mobile magnetic dipole being the opposite of the polarity of the fixed magnetic dipole;

of the mobile magnetic dipole and the fixed magnetic dipole, at least one has a tubular shape with its main axis coinciding with its polar axis so as to accept the other of said magnetic dipoles concentrically when the mobile element is occupying its unstable equilibrium position.

BRIEF DESCRIPTION OF THE FIGURES

Further features and advantages of the invention will become apparent while reading the detailed description which follows, for an understanding of which reference will be made to the attached drawings in which:

FIG. 1 is a view from above schematically depicting a forming station carrying molding units produced according to the teachings of the invention;

FIGS. 2, 2A, 2B give a view in section, on the plane of section 2-2 of FIG. 1, depicting a molding unit of the forming station, and the blowing position and the retracted position of the blowing device;

FIG. 3 is a view from above depicting a molding unit of the forming station, in which view the mold supports are in a closed position;

FIG. 4 is a view similar to that of FIG. 3, in which the mold supports are in an open position;

FIG. 5 is a side view depicting the mold supports of FIG. 4 in the open position, a locking device of the molding unit being in the unlocked position, the molding unit being equipped with a bistable device which forces the locking device into a locked position or into an unlocked position by magnetic interaction between at least one mobile dipole and at least one fixed dipole;

FIG. 6 is a view similar to that of FIG. 5 in which the mold supports are in a closed position, the locking device occupying a locked position;

FIG. 7 is a diagram depicting the variation in the repulsion force applied by the fixed dipoles of the bistable device to a mobile dipole as a function of the position of the mobile dipole with respect to the fixed dipoles;

FIG. 8 is a view in axial section on a larger scale depicting a first embodiment of the bistable device of FIG. 5 in a first stable extreme position corresponding to a locked position of the locking device;

FIG. 9 is a view similar to that of FIG. 8, depicting the bistable device in a second stable extreme position corresponding to an unlocked position of the locking device;

FIG. 10 is a view in transverse section on the plane of section 11-11 of FIG. 11;

FIG. 11 is a view similar to that of FIG. 8, depicting the bistable device in an unstable equilibrium intermediate position corresponding to an intermediate position of the locking device;

FIG. 12 is a view similar to that of FIG. 8, depicting a second embodiment of the bistable device in an unstable equilibrium position;

FIG. 13 is a view in transverse section on the plane of section 13-13 of FIG. 12;

FIG. 14 is a view similar to that of FIG. 12, depicting an embodiment variant of the second embodiment of the bistable device;

FIG. 15 is a view in transverse section on the plane of section 15-15 of FIG. 14;

FIG. 16 is a view similar to that of FIG. 8, depicting a third embodiment of the bistable device, the bistable device occupying a first stable extreme position corresponding to a locked position of the locking device;

FIG. 17 is a view similar to that of FIG. 16, in which the bistable device occupies a second stable extreme position corresponding to an unlocked position of the locking device;

FIG. 18 is a view in transverse section on the plane of section 18-18 of FIG. 17;

FIG. 19 is a face-on view depicting a molding unit comprising a bistable device produced according to a fourth embodiment of the invention, the bistable device occupying a first stable extreme position corresponding to a locked position of the locking device;

FIG. 20 is a view similar to that of FIG. 19, in which the bistable device occupies a second stable extreme position corresponding to an unlocked position of the locking device;

FIG. 21 is a view in section on the plane of section 21-21 of FIG. 19, depicting the position of the mobile dipole with respect to the fixed dipole in the first stable extreme position;

FIG. 22 is a view in section on the plane of section 22-22 of FIG. 20, depicting the position of the mobile dipole with respect to the fixed dipole in the second stable extreme position.

DETAILED DESCRIPTION OF THE INVENTION

In the remainder of the description, elements exhibiting an identical structure or equivalent functions will be denoted by the same reference.

The remainder of the description will, non-limitingly and by way of a local geometric frame of reference for each molding unit, adopt the orientations:

longitudinal "L" directed from the rear forward orthogonally to the meeting faces of the mold in the meeting position;

vertical "V" directed from the bottom upward parallel to the hinge axis of the mold supports;

transverse "T" directed from left to right, parallel to the parting line of the mold in the meeting position.

FIG. 1 schematically depicts a station 10 for forming containers made of thermoplastic material, notably of polyethylene terephthalate (PET) by blow-molding hot preforms. This forming station 10 is intended to form part of an installation for the mass production of containers. Such an installation for example comprises, in addition to the forming station 10, a station for heating cold preforms.

The forming station 10 comprises a carousel 12 mounted with the ability to rotate about a vertical axis "A" on a base 14 that is fixed relative to the ground. The carousel 12 in this instance is rotationally driven continuously in a counterclockwise direction, as indicated by the arrow "F1", by a motor (not depicted). The motor rotates at a very high speed such that the forming station is capable of producing at least around 2500 containers per hour.

Several molding units 18 are borne by the carousel 12. The molding units 18 are distributed uniformly at the periphery of the carousel 12. Each molding unit 18 is equipped with individual means for molding a container.

Each molding unit 18 here is borne by a support frame 20 fixed to the carousel 12, as illustrated in FIG. 2.

The support frame 20 bears a blowing device 21.

A first embodiment according to the invention will be described in respect of one blow-molding station, the invention being applicable to all the blowing devices.

As depicted in FIG. 2, each support frame 20 comprises a blowing device 21 also referred to as a nozzle. This blowing device 21 is able to move, notably translationally with respect to the support frame 20 between two stable extreme positions, a blowing position (as depicted in FIG. 2B) in which the blowing device rests against an upper surface of the mold to supply the preform with air, and a retracted position (as depicted in FIG. 2A) that allows the preform to be introduced or the container to be extracted. The blowing device 21 is connected to the support frame 20 notably by virtue of a linear guide rail. Relative movement between the support frame and the blowing device is brought about by a mechanism involving a roller 23 and a cam 25.

To ensure precise positioning in the vertical direction of the blowing device 21, there is a bistable device 62 which comprises:
- a fixed first element 64 that is fixed with respect to said support frame 20,
- a mobile second element 66 connected to the blowing device 21 and able to move between two stable extreme positions P1, P2 situated one on each side of an unstable equilibrium intermediate position P0, and which is connected in terms of movement to the blowing device 21, the mobile element 66 interacting with the fixed element 64 to force the blowing device 21 toward its blowing position or toward its retracted position corresponding to each of its stable extreme positions P1, P2.

The mobile element 66 comprises a first magnetic dipole, referred to as the mobile magnetic dipole 68, and the fixed element 64 comprises at least a second magnetic dipole, referred to as the fixed magnetic dipole 70, the fixed magnetic dipole 70 applying a magnetic force Fm from a distance to the mobile magnetic dipole 68 in order to force the mobile element 66 toward one or other of the stable extreme positions P1, P2 whatever its position between its two stable extreme positions P1, P2.

Each molding unit 18 comprises two mold supports 22, 24 which are mounted with the ability to move on the carousel 12. The mold supports 22, 24 here are more particularly mounted on the associated support frame 20. The molding units 18 all being identical.

A second embodiment according to the invention will be described in respect of one blowing station, the invention being applicable to all the molding units.

Each mold support 22, 24 is intended to receive a part 26, 28 of a mold, as illustrated in FIGS. 3 and 4. Specifically, a mold has at least two semi-cylindrical parts 26, 28 each having a cylindrical vertical external face 30 intended to face toward the associated mold support 22, 24, and a planar vertical internal face 32 which comprises a half-impression of the container that is to be formed. When the two mold parts 26, 28 are meeting via their internal faces 32, they thus delimit a cavity that forms the impression of the container that is to be formed. This cavity opens vertically at the top in the form of a passage 34 for a neck of the container or of the preform.

The mold supports 22, 24 are mounted with the ability to move on the carousel 12 between an open position in which the two mold parts 26, 28 are parted from one another, as depicted in FIG. 4, and a closed position in which the two mold parts 26, 28 meet along their internal face 32, as illustrated in FIG. 3.

To ensure that the internal faces 32 of the two mold parts 26, 28 meet correctly during the molding operation, it is known practice to interpose a compensation chamber 35 between the external face 30 of at least one mold part 26 and its mold support 22. Said mold part 26 is mounted with the ability to slide with a small amount of travel between a position in which it is retracted toward the mold support 22 and a position in which it extends toward the other mold part 28. During a blowing operation, this compensation chamber 35 is supplied with a fluid that is compressed under pressure to push the mold part 26 toward its extended position.

The mold supports 22, 24 here are mounted with the ability to pivot relative to one another about a hinge 36 with a vertical axis "B". Each mold support 22, 24 thus comprises a free vertical edge 38, 40 opposite to the hinge 36. The two free edges 38, 40 are parted when the mold supports 22, 24 are in the open position, as depicted in FIG. 4, and meet when the mold supports 22, 24 are in the closed position, as depicted in FIG. 3.

The hinge 36 is arranged on the side of the axis "A" of rotation of the carousel 12, while the free edges 38, 40 are arranged transversely toward the outside of the carousel 12.

The mold supports 22, 24 are automatically commanded, for example under the control of the cam, between their closed position and an extreme open position by mechanical control means. These control means are well known and do not form part of the subject-matter of the present invention. They will therefore not be described in greater detail hereinafter.

In order to ensure that the mold supports 22, 24 will maintain their closed position during the blowing operation, they are equipped with a locking device 42 for locking the mold supports 22, 24 in the closed position.

The device 42 for locking the mold supports 22, 24 in the closed position comprises at least one locking member 52 which is mounted with the ability to move on a first mold support, in this instance the right-hand mold support 24 depicted to the right in FIGS. 3 to 6. The locking member 52 is therefore mounted with the ability to move between:
- a locked position in which it collaborates with at least a blocking face 45 of the second mold support, in this instance the left-hand mold support 22 depicted on the left in FIGS. 3 to 6, to prevent the mold supports 22, 24 from opening when they are in the closed position;

and an unlocked position in which the locking member 52 is retracted with respect to the blocking face 45 to allow the mold supports 22, 24 to open.

In a first embodiment of the invention which is depicted in FIGS. 5 and 6, the locking member 52 is mounted with the ability to slide with respect to the right-hand mold support 24 that bears it.

The locking device 42 here comprises lugs 44 arranged to project outward on the free edge of one of the mold supports, in this instance the free edge 38 of the left-hand mold support 22. The lugs 44 extend in a horizontal plane and are arranged vertically one above the other along the free edge 38. They each have passing vertically through them a strike 46 of which the internal face forms the blocking face 45 of the left-hand mold support 22. The strikes 46 are vertically coaxial here. The lugs 44 here are three in number. The right-hand mold support 24 is fitted with U-shaped clevis blocks 48. Each clevis block 48 comprises two flanges extending parallel to one another in a horizontal plane. The flanges of the clevis block have guide orifices 50 passing vertically through them. The guide orifices 50 are vertically coaxial. The clevis blocks 48 are arranged vertically one above the other along the free edge 40 of the right-hand mold support 24. The right-hand mold support 24 comprises as many clevis blocks 48 as the left-hand mold support 22 has lugs 44.

When the mold supports 22, 24 are occupying their closed position, as illustrated in FIG. 6, each lug 44 is received between the two flanges of a corresponding clevis block 48. Each strike 46 coincides with the guide orifices 50 of the clevis block 48.

The locking device 42 also comprises locking members 52 formed by fingers of vertical axis which are borne by the right-hand mold support 24. The locking members 52 are guided in vertical sliding in the guide orifices 50 of the clevis blocks 48. The right-hand mold support 24 has as many locking members 52 as clevis blocks 48.

Each locking member 52 is mounted with the ability to slide vertically on the right-hand mold support 24 between an unlocked extreme lower position in which a free upper end of the locking member 52 is arranged substantially level with the lower flange of the associated clevis block 48, as depicted in FIG. 5, and a locked extreme upper position in which the locking member 52 has passed through the guide orifices 50 of the lower flange and of the upper flange of the associated clevis block 48, as depicted in FIG. 6.

As depicted in FIG. 6, when the mold supports 22, 24 are occupying their closed position, each locking member 52 thus passes through the strike 46 in the lug 44 housed in the associated clevis block 48. Each locking member 52 thus collaborates with the internal face 45 of the strike 46 to prevent the mold supports 22, 24 from opening.

In the remainder of the description, the mold supports 22, 24 will be considered to be in the closed position only when the guide orifices 50 coincide with the strikes 46 sufficiently to allow the locking members 52 to slide into their locked position by passing through the associated strikes 46, as illustrated in FIGS. 3 and 6. In any position other than the closed position thus defined, the mold supports 22, 24 are considered to be in an open position.

The locking device 42 is able to be commanded automatically, for example under the control of a cam, between its unlocked state and its locked state. For that purpose, all of the locking members 52 are fixed to a common vertical control linkage 54 which is mounted with the ability to slide vertically on the right-hand mold support 24. The linkage 54 here is longitudinally offset with respect to the locking members 52. The locking members 52 are fixed to the linkage 54 by horizontal fixing rods 55.

The linkage 54 is guided in sliding in the bases of each clevis block 48. All the locking members 52 thus slide in concert with the linkage 54. The sliding of the locking members 52 is commanded by a cam follower, in this instance a roller 56 arranged at a lower end of the linkage 54, which rolls along an upwardly oriented locking camway 58 which is fixed relative to the base 14 of the carousel 12. Thus, when the roller 56 reaches an ascending portion of the locking camway 58, the linkage 54 slides upward, as indicated by the arrow "F2" in FIG. 6, to command the locking members 52 into their locked position.

The locking members 52 are commanded toward their unlocked position, for example by an unlocking second cam. Thus, the roller 56 is capable of commanding the locking members 52 back toward their unlocked position by collaboration with a descending portion of a downwardly oriented unlocking camway 60, as indicated in broken line in FIG. 6.

In a variant which has not been depicted, the locking members may be commanded between their locked state and their unlocked state by any other known means, for example by an electric motor.

In order to prevent the locking members 52 from occupying an intermediate position somewhere between their locked position and their unlocked position, the molding unit 18 is equipped with a bistable device 62 which comprises:

a fixed element 64 that is fixed with respect to the right-hand mold support 24 which bears the locking members 52; and a mobile second element 66 which is mounted with the ability to move along a determined path on the right-hand mold support 24 and which is connected in its movement with the locking members 52.

The mobile element 66 comprises at least a first magnetic dipole, referred to as the mobile magnetic dipole 68, and the fixed element 64 comprises at least a second magnetic dipole, referred to as the fixed magnetic dipole 70.

The mobile magnetic dipole 68 and fixed magnetic dipole 70 interact with one another to force the mobile element 66 toward two stable extreme positions "P1" and "P2" which are situated at the two ends of its path, one on each side of an unstable equilibrium intermediate position "P0". The mobile element 66 thus allows the locking device 42 to be forced toward its locked position corresponding to the first stable extreme position "P1" of the mobile element 66, or toward its unlocked position corresponding to the second stable extreme position "P2" of the mobile element 66.

For this purpose, at least one of the magnetic dipoles 68, 70 applies a magnetic force "Fm" from a distance to the other magnetic dipole 70, 68 in order to force the mobile element 66 toward one or other of its two stable extreme positions "P1", "P2" whatever its position along its path.

More particularly, when the mobile element 66 is situated between its unstable equilibrium intermediate position "P0" and its first stable extreme position "P1", it is forced toward said first stable extreme position "P1", whereas when the mobile element 66 is situated between its unstable equilibrium intermediate position "P0" and its second stable extreme position "P2", it is forced toward said second stable extreme position "P2". When the mobile element 66 is occupying its unstable equilibrium intermediate position "P0", it is immediately forced toward one or other of its stable extreme positions "P1" or "P2" at random.

Each of the two magnetic dipoles 68, 70 omits a magnetic field. More specifically, each magnetic dipole 68, 70 constantly admits a magnetic field at least while the molding unit 18 is in the process of producing containers. Each magnetic dipole 68, 70 here is formed by a permanent magnet or a stack of permanent magnets. Indeed it is known that a plurality of permanent magnets stacked together and meeting one another through magnetic attraction act together as a single magnetic dipole.

Each permanent magnet is made from a material compatible with the operating temperatures of the molding units 18, which may be as high as around 100° C. Each permanent magnet is, for example, based on neodymium (Nd), being, for example, a magnet made from an alloy of neodymium, iron and boron (NdFeB). As a variant, each permanent magnet is, for example, based on samarium (Sm), being, for example, a magnet made from an alloy of samarium and cobalt (SmCo).

In a non-depicted variant of the invention, at least one of the magnetic dipoles is formed by an electromagnet. In that case, the electromagnet is powered in such a way as to produce a stationary magnetic field permanently whatever the position of the mobile element 66 when the molding unit 18 is in operation for producing containers.

In the invention embodiments depicted in the figures, each fixed magnetic dipole 70 here acts by magnetic repulsion on each mobile magnetic dipole 68 by applying to it a repulsion force "Fm" to push the mobile element 66 toward one or other of its two stable extreme positions "P1" or "P2".

The repulsion force applied by the collection of fixed magnetic dipoles 70 to the collection of mobile magnetic dipoles 68 is strong enough to keep the locking member 52 in its locked or unlocked position corresponding to one or the other of the stable extreme positions "P1" or "P2" of the mobile element 66, notably when the control roller 56 is not in contact with either one of the locking or unlocking camways 58 or 60.

In order to prevent them from interfering with the magnetic field emitted by the magnetic dipoles 68, 70, the components of the mobile element 66 and of the fixed element 64 are made from non-magnetic materials, which is to say materials exhibiting negligible magnetic susceptibility, such as aluminium, copper or plastic.

As has been depicted in FIG. 7, the repulsion force "Fm" varies as a function of the position of the mobile element 66 between its two stable extreme positions "P1" and "P2". The force "Fm" here is represented in terms of its algebraic value; it is positive when it is pushing the mobile element 66 toward its first stable extreme position "P1" and it is negative when it is pushing the mobile element 66 toward its second stable extreme position "P2". When the mobile element 66 is occupying its unstable equilibrium position "P0", the repulsion force "Fm" is zero.

The magnetic dipoles 68, 70 are arranged in such a way that the variation in the repulsion force "Fm" as a function of the position of the mobile element 66 exhibits a gradient which connects two extrema "Max1" and "Max2" of opposite signs. The magnetic dipoles 68, 70 here are designed and arranged so that the absolute value of the force "Fm" applied to the set of mobile magnetic dipoles 68 is comprised between 30 N and 100 N, for example equal to approximately 60 N, in each of its two stable extreme positions "P1" and "P2".

In the example depicted in FIG. 7, the magnetic dipoles 68, 70 are designed and arranged so that the absolute value of the force "Fm" applied to the set of mobile magnetic dipoles 68 is equal to its local extremum "Max1", or respectively "Max2", in its first stable extreme position "P1", or respectively in its second stable extreme position "P2".

In the first embodiment depicted in FIGS. 5, 6 and 8 to 11, the mobile element 66 is mounted with the ability to slide vertically with respect to the fixed element 64. The mobile element 66 more particularly moves as one with the locking members 52. The mobile element 66 here is formed by a rod of vertical axis "C" which is fixed to the linkage 54, for example via transverse rods 55. The fixed element 64 comprises bearings 72 guiding the sliding of the mobile element 66.

As depicted in FIGS. 5 and 6, the movements of the locking members 52 are limited in their locked position by a first mechanical end stop 74 and in their unlocked position by a second mechanical end stop 76. Non-limitingly, the mechanical end stops 74, 76 are formed by pins fixed to the right-hand mold support 24. Because the mobile element 66 moves as one with the locking members 52, its movements are also limited in its upper first stable extreme position "P1", which corresponds to the locked position, by the first mechanical end stop 74, as illustrated in FIG. 8, and in its lower second stable extreme position "P2", which corresponds to the unlocked position, by the second mechanical end stop 76, as illustrated in FIG. 9.

The fixed element 64 here comprises a single magnetic dipole 70. The fixed magnetic dipole 70 depicted in FIGS. 8 to 11 has a polar axis "M1" oriented parallel to the path of the mobile element 66. The polar axis "M1" is thus oriented vertically. The fixed magnetic dipole 70 is more particularly formed of at least one axially magnetized annular magnet 78. The polar axis "M1" of the annular magnet 78 thus coincides with the principal axis thereof.

Each annular magnet 78 thus exhibits, in transverse section, a central orifice 80 of circular profile through the middle of which the polar axis "M1" passes, as depicted in FIG. 10. An upper annular face 82 of each annular magnet 78 forms a first pole with a first polarity, for example a north pole "N" as depicted in FIGS. 8 to 11, while the lower annular face 84 of each annular magnet 78 forms a second pole of opposite polarity, for example a south pole "S". In the examples depicted, the fixed magnetic dipole 70 is more particularly formed by a stack of several annular magnets 78, in this instance four identical annular magnets 78.

The fixed magnetic dipole 70 is more particularly arranged in such a way that its polar axis "M1" is coaxial with the axis "C" of the mobile element 66.

The mobile element 66 here comprises a single magnetic dipole 68. The mobile magnetic dipole 68 has a polar axis "M2" oriented parallel to its path, in this instance vertical. The mobile magnetic dipole 68 is more particularly formed of at least one axially magnetized annular magnet 86. Its polar axis "M2" coincides with its principal axis, as depicted in FIG. 10.

Each annular magnet 86 exhibits, in transverse section, a central orifice 88 of circular profile through the middle of which the polar axis "M2" passes. An upper annular face 90 of each annular magnet 86 forms a first pole with a first polarity, for example a south pole "S" as depicted in FIGS. 7 to 10, while the lower annular face 92 of each annular magnet 86 forms a second pole of opposite polarity, for example a north pole "N". In the examples depicted, the mobile magnetic dipole 68 is more particularly formed by a stack of several annular magnets 86, in this instance four identical annular magnets 86.

The polar axis "M2" of the mobile magnetic dipole 68 is arranged coaxially with respect to the polar axis "M1" of the fixed magnetic dipole 70 so that the radial forces, with respect to the axis "C" of the mobile element 66, liable to be applied by the fixed magnetic dipole 70 to the mobile magnetic dipole 68 more or less cancel one another.

The mobile element 66 here is formed of a rod made in two portions, the annular magnets 86 of the mobile magnetic dipole 68 here being slipped over a terminal end of the first portion which is then fixed, for example by screwing, to the second portion so as to fix the annular magnets 86 vertically on the mobile element 66 by vertical clamping between the two portions.

The annular magnets 86 that form the mobile magnetic dipole 68 are received with sliding in the central orifice 80 of the annular magnets 78 to the fixed magnetic dipole 70, as visible in FIGS. 8 to 11. When the mobile element 66 is in the unstable equilibrium position "P0" depicted in FIG. 11, the mobile magnetic dipole 68 is received concentrically in the central orifice 80 of the fixed magnetic dipole 70, an annular air gap "g" being left radially between the external cylindrical face of the mobile magnetic dipole 68 and the internal cylindrical face of the fixed magnetic dipole 70. The polarity of the mobile magnetic dipole 68, formed by the annular magnets 86, is the opposite of the polarity of the fixed magnetic dipole 70, formed by the annular magnets 78.

During operation of the molding unit 18, starting from the locked position depicted in FIG. 6, the mobile element 66 occupies its first stable extreme position "P1" depicted in FIG. 8, in which position the fixed magnetic dipole 70 exerts an upwardly directed magnetic force "Fm" which here is equal to its local extremum "Max1". More specifically, the lower pole, in this instance the north pole "N", of the mobile magnetic dipole 68 is pushed away upward by the upper pole of like polarity of the fixed magnetic dipole 70. The mobile element 66 is thus pushed against the first mechanical end stop 74 with enough force to keep the locking member 52 in its locked position.

When the roller 56 rolls along the downward gradient of the unlocking camway 60, it applies to the mobile element 66 a vertically downwardly directed command force that overcomes the magnetic force "Fm" of the bistable device 62. The mobile element 66 thus slides vertically downward against the action of the magnetic force "Fm" until it reaches its unstable equilibrium position "P0" depicted in FIG. 11. As it does so, the intensity of the magnetic force "Fm" decreases uniformly as depicted in FIG. 7.

When the mobile element 66 passes through its unstable equilibrium position "P0" and nears its second equilibrium position "P2", the force "Fm" increases and it is directed downward so as to push the mobile element 66 toward its second stable extreme position "P2" in which it is halted by the second mechanical end stop 76, as depicted in FIGS. 5 and 9.

When the mobile element 66 reaches its second stable extreme position "P2", it is pushed against the second mechanical end stop 76 by the magnetic force "Fm" with enough intensity to keep the locking member 52 in its unlocked position.

To command the locking member 52 back toward its locked position, the roller 56 rolls along the ascending gradient of the locking camway 58, applying to the mobile element 66 a vertically upwardly directed command force which exceeds the magnetic force "Fm" of the bistable device 62. The mobile element 66 that slides vertically upward against the action of the magnetic force "Fm" until it reaches its unstable equilibrium position "P0" depicted in FIG. 11. As it does so, the intensity of the magnetic force "Fm" decreases uniformly as depicted in FIG. 7.

When the mobile element 66 passes through its unstable equilibrium position "P0" and nears its first equilibrium position "P1", the force "Fm" increases and it is directed upward so as to push the mobile element 66 toward its first stable extreme position "P1", corresponding to the locked position of the locking member 52, in which position it is halted by the first mechanical end stop 74, as depicted in FIGS. 6 and 8.

FIGS. 12 and 13 depict a second embodiment of the invention. The bistable device 62 is similar to the one described in the first embodiment of the invention. Only the differences with regard to the previous embodiment will be detailed hereinafter, the other structural elements being identical or exhibiting equivalent operation.

The fixed element 64 here comprises at least one magnetic dipole 70 of which the polar axis "M1" is oriented orthogonally to the path of the mobile element 66. The fixed magnetic dipoles 70 here are formed by permanent magnets 78.

In the example depicted in FIGS. 12 and 13, the fixed element 64 comprises two fixed magnetic dipoles 70A, 70B which are distributed symmetrically with respect to the axis "C" of sliding of the mobile element 66. Thus, the polar axes "M1" of each of the fixed magnetic dipoles 70A, 70B are arranged coaxially with respect to one another and radially with respect to the axis "C" of sliding. The mobile magnetic dipole or dipoles 68 are intended to pass between the fixed magnetic dipoles 70.

Each fixed magnetic dipole 70A, 70B thus has a pole, referred to as the active pole, which is arranged facing the path of the mobile magnetic dipole or dipoles 68.

In the example depicted, each fixed magnetic dipole 70A, 70B is formed by a permanent magnet 78. The active pole of one of the fixed magnetic dipoles 70A is formed by a north pole "N" as depicted to the left in the figures, while the active pole of the other of the fixed magnetic dipoles 70B is formed by a south pole "S". The mobile element 66 here comprises a single mobile magnetic dipole 68. The mobile magnetic dipole 68 is formed of a permanent magnet 86. The mobile magnetic dipole 68 has a polar axis "M2" oriented orthogonally to its path, in this instance radially with respect to the axis "C" of sliding. In the example depicted in FIGS. 12 and 13, the polar axis "M2" is thus oriented parallel to the polar axis "M1" of the fixed magnetic dipoles 70.

The mobile magnetic dipole 68 thus has two poles, referred to as repulsion poles, each of which is arranged facing an active pole of the same polarity of each fixed magnetic dipole 70A, 70B when the mobile element 66 is occupying its unstable equilibrium position "P0". The repulsion poles are arranged symmetrically with respect to the axis "C" of sliding. In the unstable equilibrium position "P0", the polar axes "M1, M2" of the fixed magnetic dipoles 70A, 70B and of the mobile magnetic dipole 68 are in this instance aligned.

An air gap "g" is left radially between each repulsion pole of the mobile magnetic dipole 68 and the active pole of the associated fixed magnetic dipole 70A, 70B so as to allow the mobile magnetic dipole 68 to pass without contact between the fixed magnetic dipoles 70A, 70B. The intensity of the magnetic force "Fm" may be adjusted by altering the air gap "g".

To ensure correct operation of the bistable device 62, the mobile magnetic dipole 68 needs to maintain a fixed angular position with respect to the fixed magnetic dipoles 70A, 70B in order for the polar axes "M1" and "M2" to remain mutually parallel.

The operation of the bistable device 62 produced according to this second embodiment is identical to that of the first embodiment. It will therefore not be described in greater detail hereinafter.

As a variant of this second embodiment and which is depicted in FIGS. 14 and 15, the fixed element 64 comprises more than two magnetic dipoles, in this instance four 70A, 70B, 70C, 70D, which are uniformly distributed about the axis "C" of sliding of the mobile element 66 to form a ring. Thus, the polar axes "M1" of each of the fixed magnetic dipoles 70A, 70B, 70C, 70D are arranged radially with respect to the axis "C" of sliding of the mobile element 66.

Each fixed magnetic dipole 70A, 70B, 70C, 70D thus has a pole, referred to as the active pole, which is arranged facing the path of an associated mobile magnetic dipole 68A, 68B, 68C, 68D.

Likewise, the mobile element 66 here comprises several mobile magnetic dipoles 68A, 68B, 68C, 68D which are uniformly arranged about the axis "C" of sliding. The mobile magnetic dipoles 68A, 68B, 68C, 68D are intended to pass between the fixed magnetic dipoles 70A, 70B, 70C, 70D. The mobile magnetic dipoles 68A, 68B, 68C, 68D here are each formed of a permanent magnet 86. Each mobile magnetic dipole 68A, 68B, 68C, 68D has a polar axis "M2" which is oriented orthogonally to its path, in this instance radially with respect to the axis "C" of sliding. In the example depicted in FIGS. 14 and 15, the polar axis "M2" is thus oriented parallel to the polar axis "M1" of a fixed magnetic dipole 70A, 70B, 70C, 70D.

Advantageously, all the active poles of the fixed magnetic dipoles 70A, 70B, 70C, 70D have the same polarity. These are, for example, north poles "N". In that case, the mobile element 66 has as many mobile magnetic dipoles 68A, 68B, 68C, 68D as the fixed elements 64 has fixed magnetic dipoles 70A, 70B, 70C, 70D. Each mobile magnetic dipole 68A, 68B, 68C, 68D thus has a pole referred to as "repulsion pole" which is arranged facing an active pole of the same polarity of an associated fixed magnetic dipole 70A, 70B, 70C, 70D when the mobile element 66 is occupying its unstable equilibrium position "P0".

In this unstable equilibrium position "P0", the polar axes "M1", "M2" of two associated fixed and mobile magnetic dipoles 68, 70 are aligned. An air gap "g" is left between the active pole and the associated repulsion pole.

In the first stable equilibrium extreme position "P1", the mobile magnetic dipole 68 is arranged above its unstable equilibrium position "P0", whereas in the second stable equilibrium extreme position "P2", the mobile magnetic dipole 68 is arranged below its unstable equilibrium position "P0".

With such a configuration, it is easier to orient the mobile element 66 correctly about the axis "C" of sliding so that each repulsion pole of the mobile magnetic dipoles 68A, 68B, 68C, 68D faces an associated active pole of the fixed magnetic dipoles 70A, 70B, 70C, 70D.

FIGS. 16 to 18 depict a third embodiment of the invention which is applied to the molding units 18 described in the first embodiment. Only the differences with regard to this first embodiment will be described hereinafter.

The fixed element 64 comprises several magnetic dipoles, in this instance sixteen magnetic dipoles 70, which were uniformly distributed in a ring about the axis "C" of sliding of the mobile element 66. The polar axes "M1" of each of the fixed magnetic dipoles 70 are arranged radially with respect to the axis "C" of sliding of the mobile element 66. In this way, each fixed magnetic dipole 70 has an active pole facing toward the axis "C" of sliding. The active poles all have the same polarity.

The mobile element 66 here comprises a single magnetic dipole 68. The mobile magnetic dipole 68 has a polar axis "M2" oriented parallel to its path, in this instance vertical. The mobile magnetic dipole 68 is here embodied in an identical way to that described in the first embodiment.

The mobile magnetic dipole 68 is intended to pass between the active poles of the fixed magnetic dipoles 70. One of the poles of the mobile magnetic dipole 68, referred to hereinafter as "repulsion pole", has the same polarity as the active poles of the fixed magnetic dipoles 70. The active poles and the repulsion pole in this instance are south poles "S". The repulsion pole of the mobile magnetic dipole 68 passes past the active poles of the fixed magnetic dipoles 70 when the mobile element 66 is occupying an intermediate position somewhere between its two stable extreme positions "P1" and "P2". Non-limitingly, the repulsion pole here is arranged at the bottom of the mobile magnetic dipole 68.

As the other embodiments, an air gap "g" is left radially between the mobile magnetic dipole 68 and each of the active poles of the fixed magnetic dipoles 70.

During operation of the molding unit 18, starting from the locked position depicted in FIG. 6, the mobile element 66 occupies its first stable extreme position "P1" depicted in FIG. 16, in which position the fixed magnetic dipole 70 exerts an upwardly directed magnetic force "Fm" which here is equal to its local extremum "Max1". More specifically, the repulsion lower pole, in this instance the north pole "N", of the mobile magnetic dipole 68 is pushed away upward by the active poles of like polarity of the fixed magnetic dipoles 70. The mobile element 66 is thus pushed against the first mechanical end stop 74 with enough force to keep the locking member 52 in its locked position. In this first stable extreme position "P1", the mobile magnetic dipole 68 is positioned substantially above the fixed magnetic dipoles 70.

When the roller 56 rolls along the downward gradient of the unlocking camway 60, it applies to the mobile element 66 a vertically downwardly directed command force that overcomes the magnetic force "Fm" of the bistable device 62. The mobile element 66 thus slides vertically downward against the action of the magnetic force "Fm" until it reaches its unstable equilibrium position "P0". As it does so, the intensity of the magnetic force "Fm" decreases uniformly.

When the mobile element 66 passes through its unstable equilibrium position "P0" and nears its second equilibrium position "P2", the force "Fm" increases and it is directed downward so as to push the mobile element 66 toward its second stable extreme position "P2" in which it is halted by the second mechanical end stop 76.

When the mobile element 66 reaches its second stable extreme position "P2", it is pushed against the second mechanical end stop 76 by the magnetic force "Fm" with enough intensity to keep the locking member 52 in its unlocked position. The magnetic force "Fm" here consists of the repulsion force exerted by the active poles of the fixed magnetic dipoles 70 on the repulsion pole of the mobile magnetic dipole 68, to which is added the force of attraction that the active poles of the fixed magnetic dipoles 70 apply to the pole of opposite polarity, in this instance the north pole "N" of the mobile magnetic dipole 68. In this second stable extreme position "P2", the pole of the mobile magnetic dipole 68 opposite to the repulsion pole is arranged at substantially the same level as the fixed magnetic dipoles 70.

To command the locking member 52 back toward its locked position, the roller 56 rolls along the ascending gradient of the locking camway 58, applying to the mobile element 66 a vertically upwardly directed command force which exceeds the magnetic force "Fm" of the bistable device 62. The mobile element 66 thus slides vertically upward against the action of the magnetic force "Fm" until it reaches its unstable equilibrium position "P0" depicted in FIG. 9. As it does so, the intensity of the magnetic force "Fm" decreases uniformly.

When the mobile element 66 passes through its unstable equilibrium position "P0" and nears its first equilibrium position "P1", the magnetic force "Fm" increases and it is directed upward so as to push the mobile element 66 toward its first stable extreme position "P1", corresponding to the locked position of the locking member 52, in which position it is halted by the first mechanical end stop 74.

According to a fourth embodiment of the invention which is depicted in FIGS. 19 to 22, the mobile element 66 is mounted with the ability to pivot on the right-hand mold support 24 between its two stable positions about an axis "X" of pivoting.

In the example shown in the figures, the locking members 52 are also mounted with the ability to pivot on the right-hand mold support 24 between their locked position and their unlocked position. The locking members 52 and the mobile element 66 are connected in rotation by a link rod 94 which performs the same role as the linkage 54 of the first embodiment of the invention.

The mobile magnetic dipole 68 is here mounted fixed on the mobile element 66 eccentrically with respect to the axis "X" of pivoting, while the fixed magnetic dipole 70 is fixed on the right-hand mold support 24.

The fixed magnetic dipole 70 has a polar axis "M1" which is oriented parallel to the axis "X" of pivoting of the mobile element 66. An active pole, in this instance of north polarity "N", faces toward the path of the mobile magnetic dipole 68.

The mobile magnetic dipole 68 has a polar axis "M2" which is also oriented parallel to the axis "X" of pivoting of the mobile element 66. A repulsion pole, with the same polarity as the active pole of the fixed magnetic dipole 70, is positioned facing the active pole when the mobile element 66 is occupying its unstable equilibrium position "P0".

As depicted in FIGS. 21 and 22, the fixed magnetic dipole 70 thus applies a repulsion magnetic force "Fm" to the mobile magnetic dipole 68 in order to push the mobile element 66 away toward each of its stable extreme positions "P1" or "P2" which are depicted in FIGS. 21 and 22 respectively.

The operation of the bistable device 62 embodied according to this fourth embodiment is equivalent to the operation of the bistable device 62 embodied according to the first embodiment of the invention.

The bistable device 62 produced according to the teachings of the invention allows the mobile element 66 to interact in a contactless manner with the fixed element 64. This makes it possible to avoid wearing of the moving parts of the device and to reduce the maintenance operations on the bistable device 62.

The bistable device 62 thus designed is also inexpensive to design, to manufacture and to maintain.

It will be appreciated that the bistable device 62 produced according to any one of the first three embodiments may be adapted to the molding unit 18 as described in the fourth embodiment and depicted in FIGS. 19 and 20.

The invention claimed is:

1. A station (10) for forming thermoplastic containers, which comprises:
   a unit (18) for molding containers,
   a support frame (20);
   a blowing device (21) capable of translational movement with respect to said support frame (20) between two stable extreme positions, a blow-molding position to blow the preform, and a retracted position allowing the preform to be introduced or the container to be extracted;
   a bistable device (62) which comprises:
      a fixed first element (64) that is fixed with respect to said support frame (20),
      a mobile second element (66) connected to the blowing device (21) and able to move between two stable extreme positions (P1, P2) situated one on each side of an unstable equilibrium intermediate position (P0), and which is connected in terms of movement to the blowing device (21), the mobile second element (66) interacting with the fixed first element (64) to force the blowing device (21) toward its blowing-molding position or toward its retracted position corresponding to each of its stable extreme positions (P1, P2);
   wherein the mobile second element (66) comprises a first magnetic dipole, referred to as the mobile magnetic dipole (68), and the fixed first element (64) comprises at least a second magnetic dipole, referred to as the fixed magnetic dipole (70), the fixed magnetic dipole (70) applying a magnetic force (Fm) from a distance to the mobile magnetic dipole (68) in order to force the mobile second element (66) toward one or other of the stable extreme positions (P1, P2) whatever its position between its two stable extreme positions (P1, P2).

2. The forming station (10) as claimed in claim 1, wherein the fixed magnetic dipole (70) acts by magnetic repulsion on the mobile magnetic dipole (68) by applying to it a repulsion force (Fm) to push the mobile second element (66) toward one or the other of its two stable extreme positions (P1, P2).

3. The forming station (10) as claimed in claim 1, wherein each of the magnetic dipoles (68, 70) constantly emits a magnetic field, such as a permanent magnet.

4. A station (10) for forming thermoplastic containers, which comprises:
   a unit (18) for molding containers, notably by blow-molding preforms;
   a first mold support (22) and a second mold support (24) which are each intended to support part of a mold, the mold supports (22, 24) being mounted with the ability to move one relative to the other between an open position in which they are parted from one another, and a closed position in which they meet;
   a locking device (42) for locking the mold supports (22, 24) in the closed position and which comprises at least one locking member (52) mounted with the ability to move on the second mold support (24) between a locked position in which it collaborates with at least a blocking face (45) of the first mold support (22) so as to prevent the opening of the mold supports (22, 24) and an unlocked position in which the locking member (52) is retracted with respect to the blocking face (45) so as to allow the opening of the mold supports (22, 24):
   a bistable device (62) which comprises:
      a fixed first element (64) that is fixed with respect to the second mold support (24), a mobile second element (66) which is mounted with the ability to move on the second mold support (24) between two stable extreme positions (P1, P2) situated one on each side of an unstable equilibrium intermediate position (P0), and which is connected in terms of movement to the locking member (52), the mobile second element (66) interacting with the fixed first element (64) to force the locking device (42) toward its locked position or toward its unlocked position corresponding to each of its stable extreme positions (P1, P2);

wherein the mobile second element (66) comprises a first magnetic dipole, referred to as the mobile magnetic dipole (68), and the fixed first element (64) comprises at least a second magnetic dipole, referred to as the fixed magnetic dipole (70), the fixed magnetic dipole (70) applying a magnetic force (Fm) from a distance to the mobile magnetic dipole (68) in order to force the mobile second element (66) toward one or other of the stable extreme positions (P1, P2) whatever its position between its two stable extreme positions (P1, P2).

5. The forming station (10) as claimed in claim 4, wherein the movements of the mobile second element (66) are halted in its two stable extreme positions (P1, P2) by associated mechanical end stops (74, 76), the repulsion force (Fm) applied by each fixed magnetic dipole (70) to each mobile magnetic dipole (68) being sufficient to keep the locking member (52) in its locked or unlocked position corresponding to one or other of the stable extreme positions (P1, P2) of the mobile second element (66).

6. The forming station (10) as claimed in claim 4, wherein the mobile second element (66) is mounted with the ability to slide on the second mold support (24) between its two stable extreme positions (P1, P2) along a rectilinear path.

7. The forming station (10) as claimed in claim 4, wherein the mobile second element (66) is mounted with the ability to pivot on the second mold support (24) between its two stable extreme positions (P1, P2) about an axis (X) of pivoting, the mobile magnetic dipole (68) being fixed to the mobile second element (66) eccentrically with respect to the axis (X) of pivoting.

8. The forming station (10) as claimed in claim 4, wherein the fixed magnetic dipole (70) acts by magnetic repulsion on the mobile magnetic dipole (68) by applying to it a repulsion force (Fm) to push the mobile second element (66) toward one or other of its two stable extreme positions (P1, P2).

9. The forming station (10) as claimed in claim 4, wherein each of the magnetic dipoles (68, 70) constantly emits a magnetic field, such as a permanent magnet.

10. The forming station (10) as claimed in claim 4, wherein the variation in the repulsion force (Fm) as a function of the position of the mobile second element (66) exhibits a gradient which connects two extrema (Max1, Max2) of opposite signs, the at least one fixed magnetic dipole (70) being designed so that the norm of the force (Fm) applied to the at least one mobile magnetic dipole (68) is comprised between 30 N and 100 N, for example equal to approximately 60 N, in each of its two stable extreme positions (P1, P2).

11. The forming station (10) as claimed in claim 4, wherein the fixed and mobile magnetic dipoles (68, 70) are designed so that the norm of the force (Fm) applied to the at least one mobile magnetic dipole (68) is equal to its local extremum (Max1, Max2) in each of its two stable extreme positions (P1, P2).

12. The forming station (10) as claimed in claim 4, wherein each fixed magnetic dipole (70) has a polar axis (M1) oriented orthogonally to the path of the fixed first element (64), one of the poles, referred to as the active pole, of each fixed magnetic dipole (70) being arranged facing the path of the mobile magnetic dipole (68).

13. The forming station (10) as claimed in claim 4, wherein the fixed first element (64) comprises a plurality of fixed magnetic dipoles (70), all the fixed magnetic dipoles (70) featuring an active pole of the same polarity.

14. The forming station (10) as claimed in claim 4, wherein each mobile magnetic dipole (68) has a polar axis (M2) oriented in the direction of its path, each mobile magnetic dipole (68) featuring a pole referred to as the "repulsion pole" which has the same polarity as the active pole of the fixed magnetic dipoles (70), the repulsion poles passing past the active poles when the mobile second element (66) is occupying an intermediate position between its two stable extreme positions (P1, P2).

15. The forming station (10) as claimed claim 4, wherein each fixed magnetic dipole (70) has a polar axis (M1) oriented parallel to the path of the mobile second element (66).

16. The forming station (10) as claimed claim 4, wherein each mobile magnetic dipole (68) has a polar axis (M2) oriented orthogonally to its path so that at least one repulsion pole of each mobile magnetic dipole (68) is arranged facing an active pole of the same polarity of a fixed magnetic dipole (70) as the mobile second element (66) moves between its two stable extreme positions (P1, P2).

17. The forming station (10) as claimed in claim 16, wherein each mobile magnetic dipole (68) has a polar axis (M2) oriented parallel to its path, the polarity of the mobile magnetic dipole (68) being the opposite of the polarity of the fixed magnetic dipole (70).

18. The forming station (10) as claimed in claim 17, wherein, of the mobile magnetic dipole (68) and the fixed magnetic dipole (70), at least one has a tubular shape with its main axis coinciding with its polar axis (M1, M2) so as to accept the other of said magnetic dipoles (68, 70) concentrically when the mobile second element (66) is occupying its unstable equilibrium position.

19. The forming station (10) as claimed in claim 5, wherein the mobile second element (66) is mounted with the ability to slide on the second mold support (24) between its two stable extreme positions (P1, P2) along a rectilinear path.

20. The forming station (10) as claimed in claim 5, wherein the mobile second element (66) is mounted with the ability to pivot on the second mold support (24) between its two stable extreme positions (P1, P2) about an axis (X) of pivoting, the mobile magnetic dipole (68) being fixed to the mobile second element (66) eccentrically with respect to the axis (X) of pivoting.

* * * * *